H. L. SMITH.
RADIUS BAR.
APPLICATION FILED DEC. 11, 1918.
1,296,867.
Patented Mar. 11, 1919.
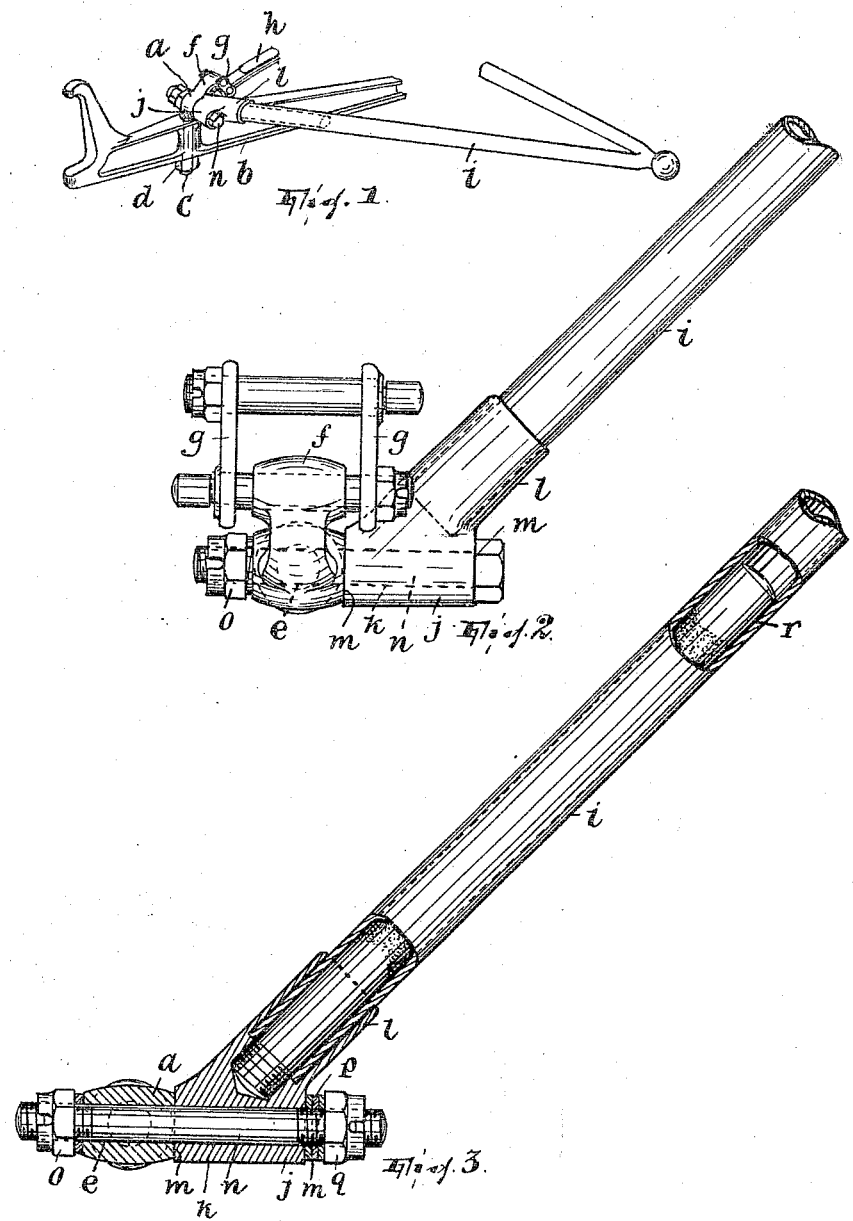

UNITED STATES PATENT OFFICE.

HENRY LUND SMITH, OF PATERSON, NEW JERSEY.

RADIUS-BAR.

1,296,867.　　　Specification of Letters Patent.　　Patented Mar. 11, 1919.

Application filed December 11, 1918.　Serial No. 266,204.

*To all whom it may concern:*

Be it known that I, HENRY LUND SMITH, a citizen of the United States, residing at Paterson, in the county of Passaic and State of New Jersey, have invented certain new and useful Improvements in Radius-Bars, of which the following is a specification.

The connecting means between the front axle of a Ford automobile and the forward end of each member of the radius bar which braces the axle usually consists of a standard or "perch" fixed to the axle and a plug which is brazed in the (tubular) end of said member and has a threaded stud which penetrates and is secured in the perch by a nut screwed on the stud. This stud frequently breaks off so that the axle being no longer rigidly braced the vehicle cannot be properly steered and hence safely driven until the radius bar is repaired or replaced by a new one. The principal object of this invention is to provide a connection of the kind indicated which will not only be much stronger than that now used but adapted for immediate repair on the road; also for adjustment, so that if the radius bar should become buckled as the incident of some unusual shock sustained by the axle it may still perform its function of reinforcing the axle with the latter in true parallelism, for the purpose of steering, with the rear axle of the vehicle. Another object is to reinforce the forward tubular portion of each member of the radius bar.

The accompanying drawing shows,

In Figure 1 the front axle and the radius bar of a Ford automobile equipped with the improved connection;

Fig. 2 is a plan view of said connection; and

Fig. 3 is a plan, partly in section, showing the radius bar and connection, with means to reinforce the radius bar against buckling.

$a$ designates the fixture on the front axle $b$ which forms the perch, the same having a threaded depending stud $c$ penetrating the axle and equipped with a nut $d$ to secure the perch in place, and also having the bore $e$, which is horizontal and transverse with respect to the axle, and an overhanging head $f$ by which, through the medium of links $g$, the front spring $h$ is suspended. $i$ is one of the tubular members of the radius bar.

On the free end of the said member is a fixture described as follows: Said fixture has a body portion $j$ formed with a bore $k$ to true up with the bore $e$ of the perch, and projecting in oblique relation to this bore and integral with body portion $j$ a tubular projecting portion or socket $l$, which is telescoped over the end of member $i$ of the radius bar and brazed thereto. The end faces $m$ of body portion $j$ are formed flat and at right angles to bore $k$.

The two fixtures are secured together by the bolt $n$ which is passed through their bores $e$ and $k$ and has a nut $o$ screwed thereon to coact with the bolt to clamp the fixtures together. Sometimes the member $i$ of the radius bar will become bent and so hold the front axle out of parallelism with the rear axle, so that the steering of the vehicle is interfered with, and to permit adjustment to correct the position of the front axle in such a case a set of washers $p$ (Fig. 3) may be kept in reserve between the head of, or it may be another nut $q$ screwed on, the bolt and the adjoining face $m$ of the fitting $j$—$l$, to be transferred to a place between the perch and the other face $m$ when the emergency indicated arises.

The fixture $j$ $l$ obviously affords a much stronger anchorage on the member $i$ of the radius bar than the plug and its stud now commonly used. In addition there is the advantage that if the bolt $n$ should break repair can be made on the road by simply substituting the new one.

In order to reinforce the radius bar member $i$ and prevent its buckling or bending as above stated (which usually occurs more or less near the front axle) I may screw into the fitting $j$—$l$, through its tubular portion $i$, a rod $r$ which snugly fits the member $i$ and projects beyond the telescoped joint between said member and the portion $l$ of said fitting and is preferably brazed to member $i$.

Having thus fully described my invention, what I claim as new and desire to secure by Letters Patent is:—

1. In combination, with the axle and one member of the radius bar of a vehicle, said member being arranged oblique to the axle, a connection between said member and axle consisting of a fixture on the axle, another fixture on said member, the latter fixture including a body portion having a bore therethrough and a projecting portion oblique to said bore and having a telescoped connection with said member, and a bolt penetrating said bore and the first fixture and having a nut screwed thereon and coacting with the bolt to clamp said fixtures together.

2. In combination, with the axle and the tubular end of one member of the radius bar of a vehicle, a connection between said member and axle consisting of a fixture on the axle, another fixture on and forming a telescoped joint with the end of said member, a rod rigidly secured at one end in the latter fixture and projecting through and beyond the joint into and fitting said member, and a bolt securing said fixtures together.

In testimony whereof I affix my signature.

H. LUND SMITH.